Nov. 15, 1960 L. P. GARVEY 2,960,362
VEHICLE DOOR LATCH AND LATCH CONTROL APPARATUS
Filed June 9, 1958 5 Sheets-Sheet 1
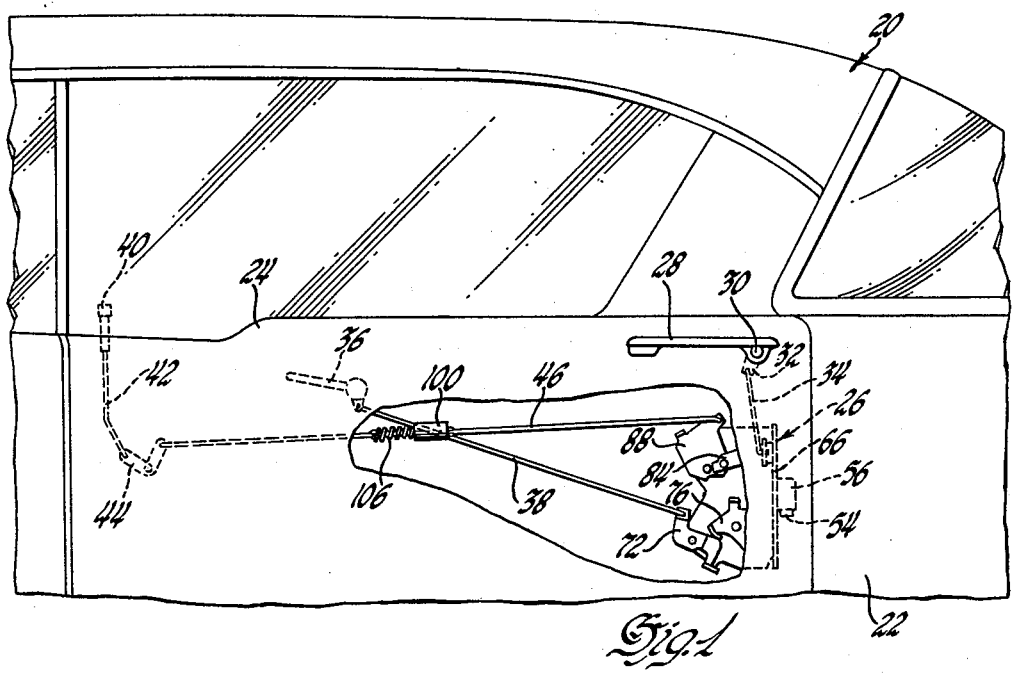
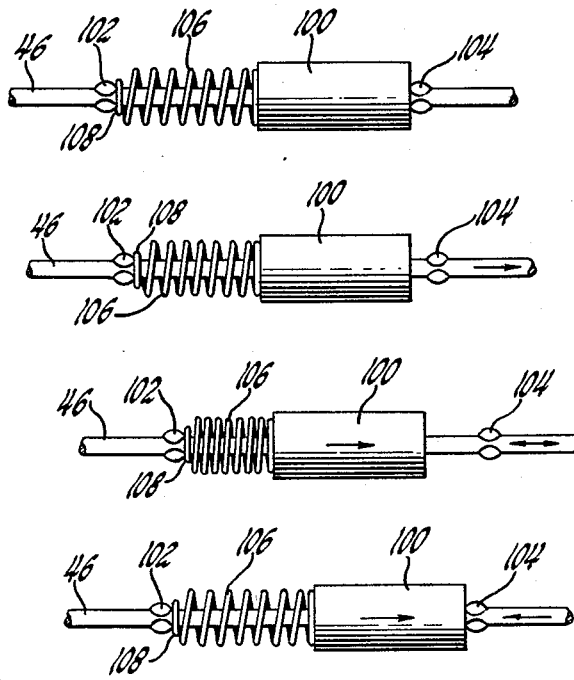
INVENTOR.
Louis P. Garvey
BY
W. S. Pettigrew
ATTORNEY

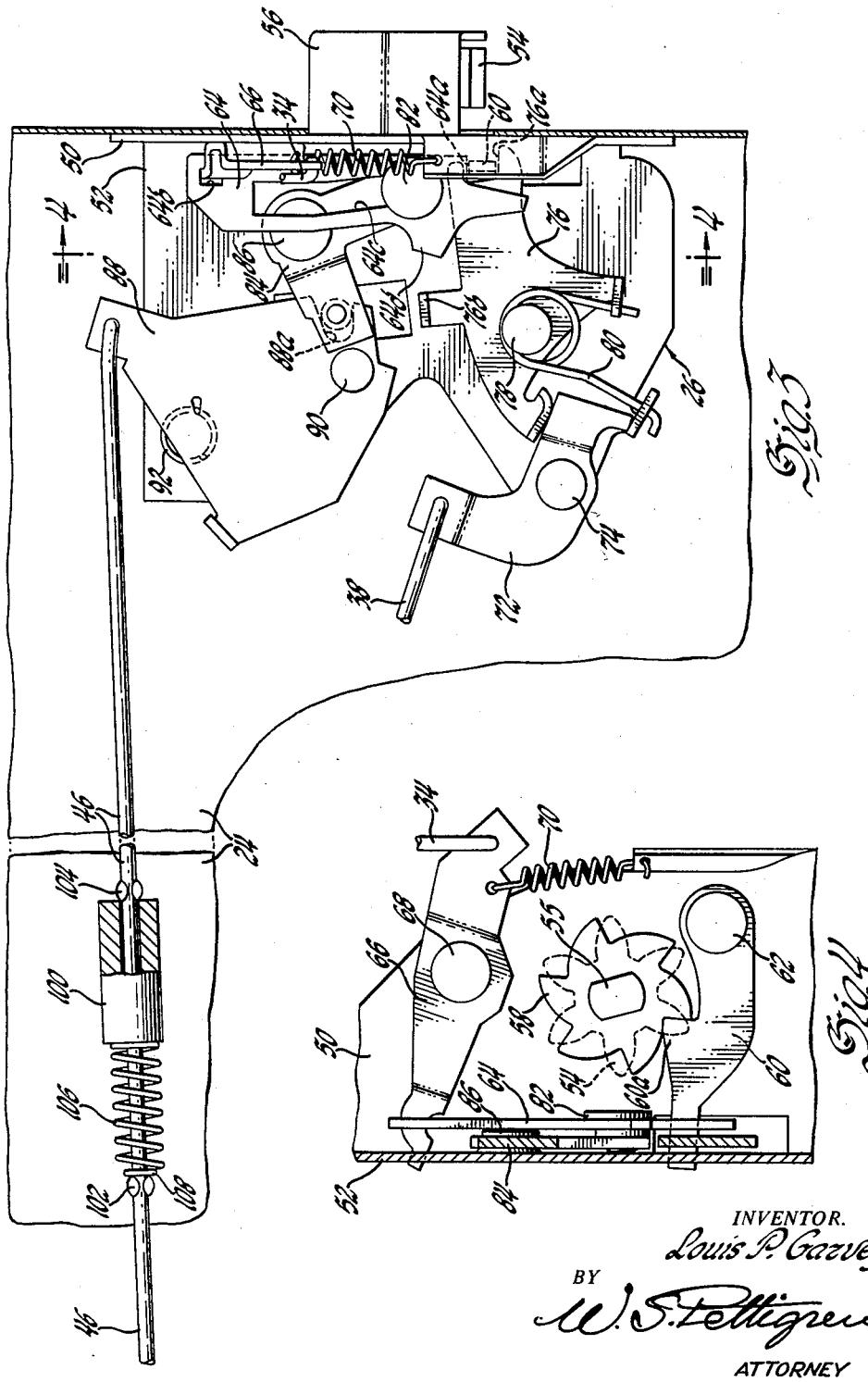

Nov. 15, 1960 L. P. GARVEY 2,960,362
VEHICLE DOOR LATCH AND LATCH CONTROL APPARATUS
Filed June 9, 1958 5 Sheets-Sheet 3
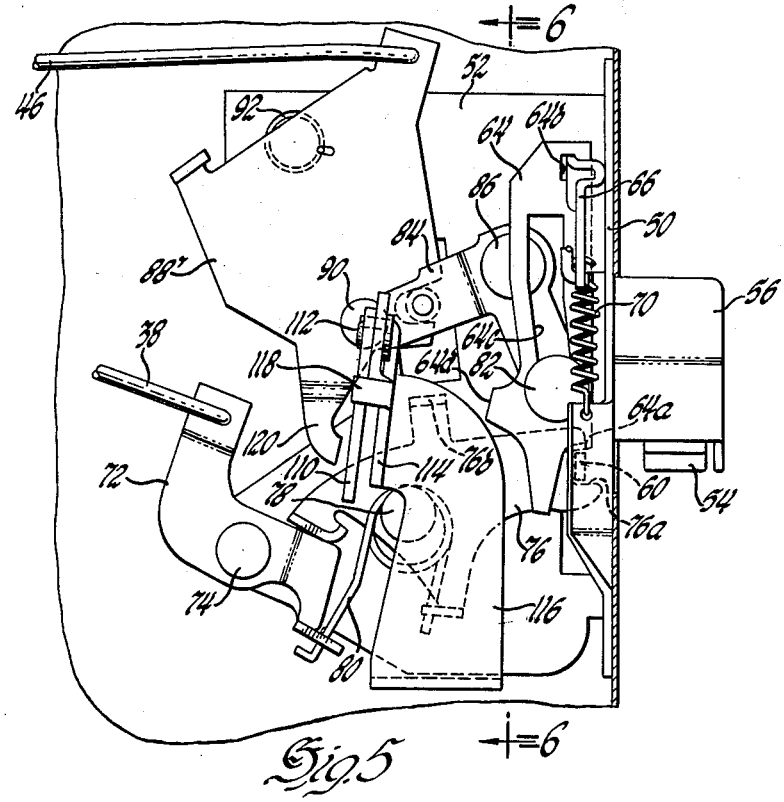
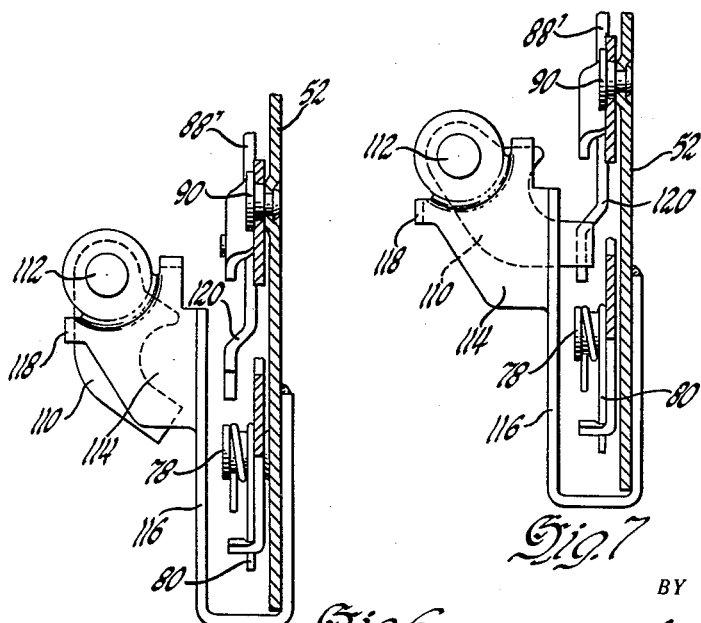
INVENTOR.
Louis P. Garvey
BY
W. S. Pettigrew
ATTORNEY Nov. 15, 1960  L. P. GARVEY  2,960,362
VEHICLE DOOR LATCH AND LATCH CONTROL APPARATUS
Filed June 9, 1958  5 Sheets-Sheet 4
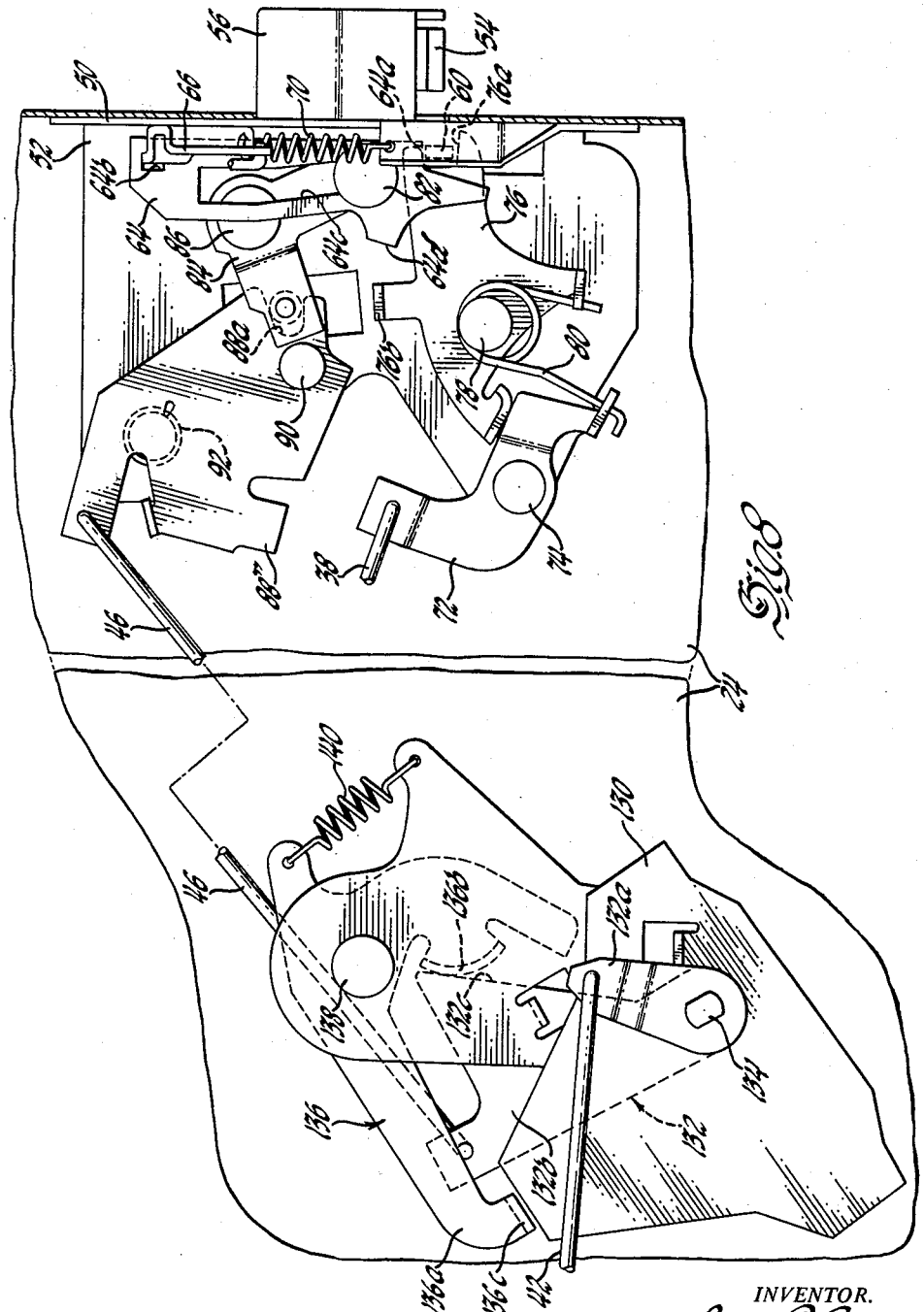
INVENTOR.
Louis P. Garvey
BY
W. S. Pettigrew
ATTORNEY Nov. 15, 1960  L. P. GARVEY  2,960,362
VEHICLE DOOR LATCH AND LATCH CONTROL APPARATUS
Filed June 9, 1958  5 Sheets-Sheet 5
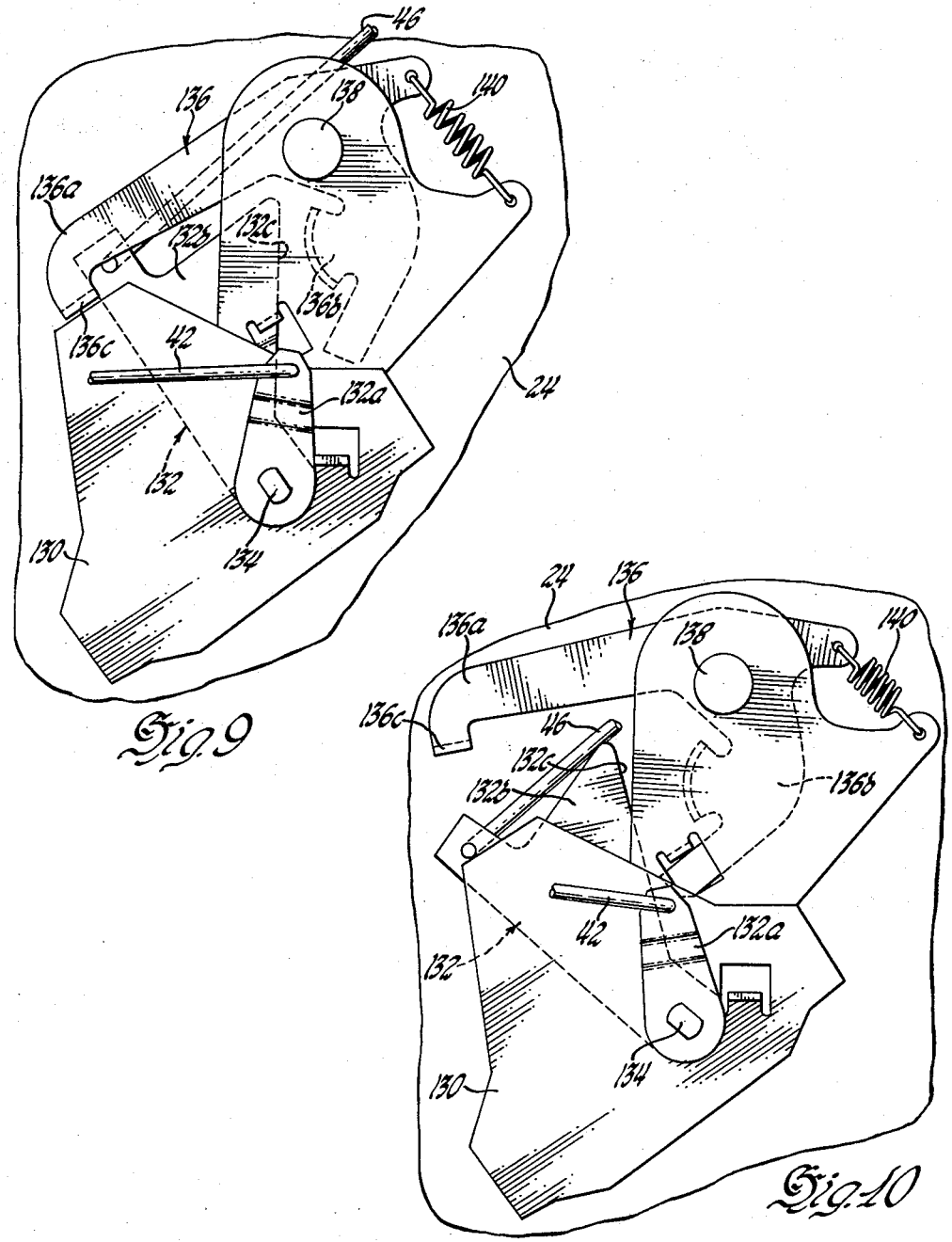
INVENTOR.
Louis P. Garvey
BY
W. S. Pettigrew
ATTORNEY United States Patent Office 2,960,362
Patented Nov. 15, 1960

2,960,362

VEHICLE DOOR LATCH AND LATCH CONTROL APPARATUS

Louis P. Garvey, Birmingham, Mich., assignor to General Motors Corporation, Detroit, Mich., a corporation of Delaware Filed June 9, 1958, Ser. No. 740,617

12 Claims. (Cl. 292—280)

This invention relates to vehicle door latch and latch control apparatus, and more particularly to anti-rebound means for the locking parts of an automobile door latch.

Many commercial automobile door latches include a manually operable locking device, as a conventional garnish molding button, which is connected by a rod to a locking lever in the door latch, and the door latch is so arranged that if the garnish molding locking device is actuated to lock the latch parts while the door is open, the latch parts will be shifted back to unlocked position in response to closing movement of the door. This so-called "automatic undogging" prevents the operator from inadvertently locking himself out of the car. Such door latches have additional means which may override the automatic undogging means to permit keyless locking.

For example, in automobiles produced by the assignee of this application, if the lock parts are shifted to locked position when the door is open, as by depressing the garnish molding button or by outside key actuation, merely slamming the door will cause the automatic undogging means to function to shift the door lock parts back to unlocked position. However, if the operator desires to lock the door without a key, he merely locks the door while in open position and pushes in on the outside push button while the door is being shut to render the automatic undogging function ineffective. A rotary bolt type of door latch incorporating automatic undogging and keyless locking of the type discussed above is disclosed in detail in Leslie Patent No. 2,796,276, entitled "Rotary Bolt Door Latch" which issued on June 18, 1957. Another rotary bolt door latch of modified construction but incorporating the same automatic undogging and keyless locking features is shown and described in the copending application of James D. Leslie, filed September 13, 1955 as Serial No. 534,034 and entitled "Rotary Bolt Door Latch." This application issued on March 10, 1959 as Patent No. 2,877,043.

It frequently happens that when the door is slammed shut while in locked condition, the locking parts rebound and shift back to locked condition so that the door is locked despite the fact that the operator failed to depress the outside push button, and consequently, did not intend to lock the door when he closed it. This invention provides a means for preventing rebound of the locking parts to locked position after the automatic undogging or shifting to unlocked condition in response to closing movement of the door has been accomplished.

The invention is incorporated in three species, all of which include inertia means for preventing rebound of the locking parts to locked position. In the preferred species there is a spring cushioned weight slidably mounted on the rod which connects the locking lever in the door to the garnish molding button. This weight operates through inertia to prevent rebound of the locking lever to locked position. In a second species of the invention a blocking lever is mounted on the latch frame and is swung by inertia into blocking relationship with the locking lever to prevent rebound. In a third species of the invention a blocking lever is carried in a transfer mechanism located between the door latch and the manual locking device. This blocking lever is moved by a part of the transfer mechanism into blocking relationship with said part during the automatic undogging function and is held by inertia in blocking relation to prevent rebound to locked position.

One feature of the invention is that it provides an improved vehicle door latch and latch control apparatus; and another feature of the invention is that it provides a vehicle door latch and latch control apparatus including inertia means for preventing rebound of the locking parts of the latch to locked position.

Other features and advantages of the invention will be apparent from the following description and from the drawings, in which:

Fig. 1 is a fragmentary side elevation of an automobile incorporating the improved latch and latch control apparatus in a rear door, a portion of the rear door outer panel being broken away to show underlying structure;

Fig. 2 is a detail illustration of a portion of the apparatus of Fig. 1 in various positions of an operating cycle;

Fig. 3 is an enlarged vertical longitudinal section through the door showing a portion of the apparatus of Fig. 1;

Fig. 4 is a transverse vertical section taken along the line 4—4 of Fig. 3;

Fig. 5 is a view similar to a portion of Fig. 3 but showing a modified form of the invention;

Fig. 6 is a detail section taken along the line 6—6 of Fig. 5;

Fig. 7 is a section similar to Fig. 6 but showing the parts in a different position;

Fig. 8 is a view similar to Fig. 3 but showing another modified form of the invention;

Fig. 9 is a view similar to a portion of Fig. 8 but showing the parts in another position; and Fig. 10 is a view similar to Fig. 9 but showing the parts in still another position.

Referring to the drawings, and more particularly to the preferred embodiment of the invention shown in Figs. 1–4, an automobile designated generally as 20 in Fig. 1 has a rear quarter body portion 22 and a rear door 24 which is hingedly mounted by conventional means (not shown) at its front edge and which, adjacent its rear swinging edge, mounts a door latch indicated generally at 26 in Fig. 1 and shown in more detail in Figs. 3 and 4. The door latch has inside and outside operators and an inside locking device, all of known construtcion. An outside gripping handle 28 is fixedly mounted on the door 24 adjacent the belt line of the automobile above the latch 26. A push button 30 which is slidable in the handle 28 is connected through a conventional motion transfer mechanism 32 and an operating rod 34 to the door latch. On the inner panel of the door is mounted a turn handle 36 which is connected through a rod 38 to the door latch and an inside locking device comprises a conventional garnish molding push button 40 connected through a rod 42 to a motion transfer mechanism comprising a bell crank 44. This bell crank is connected to a locking lever in the latch through a rod 46.

The latch is generally similar to the latch of Leslie Patent No. 2,796,276 and is substantially identical with the latch of Patent No. 2,877,043. The latch comprises a frame having a portion 50 secured to the jamb face of the door 24 by screws or other conventional means and a right angular flange portion 52 lying parallel to and adjacent the inner panel of the door. A bolt 54 is rigidly mounted on the outside face of the frame portion 50 on a stud 55 rotatably carried in the frame body 50 and in a bolt housing 56. A ratchet 58 is also rigidly mounted on the stud 55 on the opposite or inner face of the frame body 50 so that the bolt and stud comprise unitary latching means. The bolt has a plurality of teeth for engagement with a striker mounted on the body rear quarter 22 as shown and described in Leslie Patent 2,796,276. A detent 60 is pivotally mounted on a pin 62 on the frame body 50, the detent having a latching tooth 60a for engagement with a tooth of the ratchet to hold the bolt and ratchet against rotation in a door opening direction (clockwise in Fig. 4). When the door is slammed shut, the bolt rides over complementary teeth in the striker so that the bolt and ratchet rotate, camming the detent 60 over the sloping back sides of one or more of the ratchet teeth. Release means are provided for moving the detent out of holding relationship with the latching means so that the latching means is freely rotatable and the door can be opened. As shown in Figs. 3 and 4 there is an intermittent link 64 carried in parallel relationship to the frame flange 52 and having a shoulder 64a (Fig. 3) which overlies the free swinging end of the detent 60 so that when the intermittent link moves down from the position of Fig. 3, it swings the detent downwardly to move the latching tooth 60a out of holding engagement with the ratchet and the latching means is freely rotatable so that the door can be opened.

In order to operate the intermittent link from outside the automobile, there is a rock lever 66 pivotally mounted intermediate its ends on a stud 68 on the frame body 50. One end of the rock lever projects through an opening 64b in the intermittent link and the other end of the lever 66 is connected to the operating rod 34. A spring 70 yieldably holds the rock lever in the position shown in Figs. 3 and 4. When the push button 30 is operated, the rod 34 is pulled up so that the intermittent link 64 is shifted downwardly, carrying with it the detent 60. The inside operating means comprises a remote lever 72 pivoted on a stud 74 on the frame flange and connected to the operating rod 38. An arm on the lever 72 underlies a flanged arm on an intermediate lever 76 pivoted at 78 on the frame flange and a spring 80 on the pivot stud 78 biases the lever 76 in a counterclockwise direction as the parts appear in Fig. 3. At the free end of the lever 76 there is a notch 76a which receives the free end of the detent 60. When the remote handle 36 is turned, the rod 38 is pulled to the left in Fig. 3, swinging the remote lever 72 counterclockwise and the intermediate lever 76 clockwise to swing the detent down out of holding engagement with the latching means.

In order to lock the door, the intermittent link 64 is swung in a clockwise direction in Fig. 3 to move the shoulder 64a of the intermittent link away from the detent 60. Since this is a rear door latch, there is no outside key lock, and in the latch illustrated the door is only locked against outside operation and is never locked against inside operation since the inside remote handle 36 operates directly on the detent 60 and does not operate through the intermittent link 64. The intermittent link 64 has an elongated slot 64c through which projects a headed pin 82 mounted on one arm of a locking bell crank 84 which is pivoted on a stud 86 on the frame flange 52. The other arm of this bell crank is connected in a notch 88a in a locking lever 88 pivoted on a stud 90 on the flange 52. The locking lever is swingable between locked and unlocked positions, the unlocked position being shown in Fig. 3. When the locking lever is swung in a counterclockwise direction, it swings the locking bell crank 84 clockwise and the intermittent link 64 is swung clockwise about an axis formed by the connection of the lever 66 in the slot 64b so that the shoulder 64a on the intermittent link moves away from the detent 60 and, on operation of the outside push button 30, the intermittent link merely free wheels without picking up the detent. An overcenter spring 92 which is connected between the locking lever 88 and the frame 52 yieldably holds the parts either in locked or unlocked position. The locking lever 88 is connected to the rod 46 which, as shown in Fig. 1, is connected to and operated by the garnish molding button 40.

In order to prevent the operator from inadvertently locking himself out of the car, a function known in the art as automatic undogging is incorporated in the latch. If the garnish molding button is depressed while the door is open to swing the intermittent link to locked position, closing the door will cause the intermittent link to be swung back to unlocked position. In order to accomplish this, there is an undogging shoulder 64d on the intermittent link 64 and a complementary undogging flange 76b formed on an upstanding arm of the intermediate lever 76. When the intermittent link is swung to locked position, the undogging shoulder 64d lies closely adjacent the undogging flange 76b. As explained earlier, when the door is slammed shut, the bolt rides over complementary striker teeth as shown in Leslie Patent 2,796,276, rotating the bolt and ratchet in a counterclockwise direction as the parts appear in Fig. 4. During this rotation the detent 60 is cammed by the sloping back surface of one or more of the ratchet teeth. As the detent is cammed, its free end swings down, carrying with it the intermediate lever 76 which moves in a clockwise direction so that the undogging flange 76b picks up the undogging shoulder 64d and moves the parts from locked to unlocked position in response to the closing movement of the door. While not a part of the present invention, it should be noted that the door can be locked without a key if the operator desires, by pushing in on the push button 30 during door closing movement. This operation shifts the intermittent link 64 downwardly so that its undogging shoulder 64d is out of the path of swinging movement of the undogging flange 76b.

It has been found that under certain conditions of operation the latch and control parts would rebound back to locked condition after the automatic undogging function occurred. In other words, when the door is slammed, the undogging function as described above will occur, but the parts may rebound back to locked position, causing the door to be locked. This invention provides a novel inertia means in combination with a latch and control apparatus for the latch for preventing rebound of the locking lever to locked position. In the preferred form of the invention, this inertia means comprises a spring-biased weight slidably mounted on the locking rod 46. As illustrated in Figs. 1, 2 and 3, a weight 100 is slidably mounted on the rod 46 intermediate the ends thereof. Movement of the weight on the rod 46 is limited by spaced embossments 102 and 104 formed on the rod, and a spring 106 is mounted on the rod, one end seating against a collar 108 which abuts the embossment 102 and the other end seating against the weight. The spring is under enough compression normally to urge the weight against the embossment 104. If desired, collars may be fixedly mounted on the rod instead of forming embossments integrally thereon.

Fig. 2 illustrates the operation of the inertia device as the door is closed. In the top view of Fig. 2, the parts are in the position they have assumed after the garnish molding button has been depressed to shift the rod 46 to the left and swing the locking lever counterclockwise to locked position. As pointed out above, the overcenter spring 92 yieldably holds the parts in this position. As the door is slammed shut and the undogging operation commences, the rod starts to move rapidly to the right as shown in the second view of Fig. 2. The weight, due to its inertia, momentarily stands still, compressing the spring 106. The third view of Fig. 2 shows the position of the structure when the rod 46 has reached its unlocked position and is ready to rebound. Here the force of the spring 106 has started to overcome the inertia of the weight and the weight has commenced to move to the right. The fourth view of Fig. 2 shows how the weight engages the embossments 104 to stop rebound of the rod 46 before the locking parts have moved far enough toward locked position to cause the overcenter spring to urge them farther toward locked position.

A second embodiment of the invention is shown in Figs. 5, 6 and 7. In these views the conventional parts of the latch are similar to the latch described in connection with Figs 3 and 4, and the latch includes undogging means for moving the locking lever 88' from locked to unlocked position in response to closing movement of the door. In this embodiment of the invention the inertia means for preventing rebound of the locking lever to locked position comprises an inertia lever 110 pivotally mounted on a stud 112 which is carried on a flange 114 bent from a frame extension 116 welded to the flange 52 of the latch frame and extending in spaced parallel relation to the latch frame 52. The inertia lever 110 is pivoted adjacent its top and hangs down in the manner of a pendulum, being held against swinging movement in an operative direction past a generally vertical position by a stop tab 118 bent from the bracket 114. Fig. 6 shows the inertia lever 110 in its normal inoperative position where it is out of the path of locking movement of an integral anti-rebound arm 120 formed on the locking lever 88'. When the door is slammed shut, inertia of the pendulum-like lever 110 will cause it to swing from the inoperative position of Fig. 6 to the operative position of Fig. 7 where it is in the path of locking movement of the arm 120, thus blocking rebound of the locking lever 88'. During the time that the undogging operation occurs to swing the locking lever 88' to its unlocked position of Fig. 5, the inertia lever 110 is in its inoperative position because the automatic undogging occurs before the door reaches its fully closed position. As closing movement of the door suddenly stops, the inertia lever starts to swing to its operative or blocking position where it prevents rebound of the parts to locked position.

Figs. 8, 9 and 10 show a third embodiment of the invention in which the inertia device for preventing rebound of the locking lever to locked position is located in a transfer mechanism between the latch and the garnish molding button. In this embodiment of the invention, rod 46 extends from the locking lever 88" in the latch to a transfer mechanism which is comparable to but different in detail from the bell crank 44 shown in Fig. 1. This transfer mechanism, which is mounted on a frame 130 in the door, comprises a motion transfer lever designated generally as 132. This lever is pivoted on a stud 134 on the frame 130 and has two rigidly connected arms. The lever arm 132a is connected to the rod 42 which, as shown in Fig. 1, extends to the garnish molding button 40 and the lever arm 132b is connected to the rod 46. An inertia lever 136 is mounted on a stud 138 on the frame 130 and is biased by a tension spring 140 which is connected between the inertia lever and the frame to an inoperative position as shown in Fig. 10. The lever 136 has a blocking arm 136a and a flanged cam arm 136b which, when the parts are in locked position as shown in Fig. 10, is spaced from a cam surface 132c on the lever arm 132.

When the door is closed to cause the automatic undogging operation, the rod 46 moves to the left from the position of Fig. 10 to the position of Fig. 8, swinging the lever 132 clockwise so that the cam surface 132c engages the flange arm 136b and swings the inertia lever 136 from the position of Fig. 10 to the position of Fig. 8 in which a blocking tab 136c formed on the end of the blocking arm 136a lies in the path of locking rebound movement of the lever arm 132b. Fig. 9 shows how the inertia lever 136 prevents rebound of the parts to locked position. As the lever 132 starts to swing counterclockwise as the locking parts commence to rebound, its arm 132b engages the blocking tab 136c to stop rebound. Since the rebound action is stopped before the overcenter spring 92 has moved to the locking side of center, this spring returns the lever 132 and associated locking parts to the unlocked position of Fig. 8 and the spring 140 swings the inertia lever clockwise to its inoperative or out-of-the-way position as illustrated in Fig. 10.

While I have shown and described several embodiments of my invention, it is capable of many modifications. Changes, therefore, in the construction and arrangement may be made without departing from the spirit and scope of the invention as set forth in the appended claims.

What is claimed is:

1. Vehicle door latch and latch control apparatus of the character described, including: a latch on the door having latching means, latch release means and locking means including a plurality of locking parts which are movable between a locked position in which the latch release means is rendered ineffective and an unlocked position in which the latch release means is effective, said locking parts having inherent inertia; means for moving said locking means from locked to unlocked position in response to closing movement of the door; and inertia means separate from the locking parts of the door latch for aiding the inherent inertia of said locking parts and preventing rebound of said locking parts to locked position when the door closes.

2. Vehicle door latch and latch control apparatus of the character described, including: latching means on the door adapted to engage a keeper on the vehicle to hold the door closed; a detent adapted to hold the latching means against movement in door opening direction; release means for moving the detent out of holding relationship with the latching means; a locking lever mounted for movement between a locked position wherein it renders the release means ineffective to move the detent and an unlocked position wherein the release means is effective to move the detent; a manually operable lock device; means connecting said locking device to said locking lever, said locking lever, manually operable lock device and connecting means having inherent inertia; means for moving said locking lever from locked to unlocked position in response to closing movement of the door; and inertia means separate from the locking parts of the door latch for aiding said inherent inertia and preventing rebound of said locking lever to locked position when the door closes.

3. Vehicle door latch and latch control apparatus of the character described, including: latching means on the door adapted to engage a keeper on the vehicle to hold the door closed; a detent adapted to hold the latching means against movement in a door opening direction; release means for moving the detent out of holding relationship with the latching means; a locking lever mounted for movement between a locked position wherein it renders the release means ineffective to move the detent and an unlocked position wherein the release means is effective to move the detent; a manually operable locking device on the door; means including a rod connecting said locking device to said locking lever; means for moving said locking lever from locked to unlocked position in response to closing movement of the door; and inertia means movably mounted on said rod for preventing rebound of said rod and locking lever to locked position when the door closes.

4. Apparatus of the character claimed in claim 3, wherein said inertia means comprises a weight slidably mounted on said rod, spaced stop means on the rod limiting the range of slidable movement of the weight, and spring means yieldably urging the weight toward said stop means.

5. Vehicle door latch and latch control apparatus of the character described, including: a latch frame mounted on the door; latching means on said frame adapted to engage a keeper on the vehicle to hold the door closed; a detent on said frame adapted to hold the latching means against movement in a door opening direction; release means on said frame for moving the detent out of holding relationship with the latching means; a locking lever mounted for movement on said frame between a locked position wherein it renders the release means ineffective to move the detent and an unlocked position wherein the release means is effective to move the detent; a manually operable locking device on the door; means including a rod connecting said locking device to said locking lever; means for moving said locking lever from locked to unlocked position in response to closing movement of the door; and inertia means comprising a pendulum lever pivotally mounted on said frame for preventing rebound of said locking lever to locked position when the door closes.

6. Vehicle door latch and latch control apparatus of the character described, including: latching means on the door adapted to engage a keeper on the vehicle to hold the door closed; a detent adapted to hold the latching means against movement in a door opening direction; release means for moving the detent out of holding relationship with the latching means; a locking lever mounted for movement between a locked position wherein it renders the release means ineffective to move the detent and an unlocked position wherein the release means is effective to move the detent; a manually operable locking device on the door; means including a rod and motion transfer apparatus connecting said locking device to said locking lever; means for moving said locking lever from locked to unlocked position in response to closing movement of the door; and inertia means comprising a lever pivotally mounted on said motion transfer apparatus for preventing rebound of said rod and locking lever to locked position when the door closes.

7. Vehicle door latch and latch control apparatus of the character described, including: a latch frame on the door; latching means on the frame adapted to engage a keeper on the vehicle to hold the door closed; a detent movably mounted on the frame and adapted to hold the latching means against movement in a door opening direction; release means for moving the detent out of holding relationship with the latching means; a locking lever mounted on the frame for movement between a locked position wherein it renders the release means ineffective to move the detent and an unlocked position wherein the release means is effective to move the detent; a manually operable locking device on the door; means including a rod and a motion transfer bell crank connecting said locking device to said locking lever; means for moving said locking lever from locked to unlocked position in response to closing movement of the door; and inertia means for preventing rebound of said rod and locking lever to locked position when the door closes comprising a weight slidably mounted on said rod, spaced stop means on said rod limiting slidable movement of the weight thereon, and a spring on the rod yieldably urging said weight into engagement with said stop means.

8. Vehicle door latch and latch control apparatus of the character described, including: a latch frame on the door; latching means on the frame adapted to engage a keeper on the vehicle to hold the door closed; a detent movably mounted on the frame and adapted to hold the latching means against movement in a door opening direction; release means for moving the detent out of holding relationship with the latching means; a locking lever mounted on the frame for movement between a locked position wherein it renders the release means ineffective to move the detent and an unlocked position wherein the release means is effective to move the detent, a manually operable locking device on the door; means including a rod and a motion transfer bell crank connecting said locking device to said locking lever; means for moving said locking lever from locked to unlocked position in response to closing movement of the door; and inertia means for preventing rebound of said locking lever to locked position when the door closes comprising a pendulum-like lever pivotally mounted on said frame and adapted to swing into blocking relationship to said locking lever when the door closes to prevent rebound of the locking lever to locked position.

9. Vehicle door latch and latch control apparatus of the character described, including: a latch frame on the door; latching means on the frame adapted to engage a keeper on the vehicle to hold the door closed; a detent movably mounted on the frame and adapted to hold the latching means movement in a door opening direction; release means for moving the detent out of holding relationship with the latching means; a locking lever mounted on the frame for movement between a locked position wherein it renders the release means ineffective to move the detent and an unlocked position wherein the release means is effective to move the detent; a manually operable locking device on the door; means including a rod and a motion transfer bell crank connecting said locking device to said locking lever; means for moving said locking lever from locked to unlocked position in response to closing movement of the door; and inertia means for preventing rebound of said rod and locking lever to locked position when the door closes comprising a blocking lever pivotally mounted adjacent said motion transferring bell crank and adapted to move into blocking relationship thereto when the door closes to prevent rebound of said bell crank.

10. Apparatus of the character claimed in claim 9, wherein said bell crank has a cam portion adapted to engage a follower portion on said blocking lever to swing said blocking lever into blocking relation to said bell crank when the bell crank moves to unlocked position.

11. Vehicle door latch and latch control apparatus of the character described, including: a latch frame on the door; latching means on the frame adapted to engage a keeper on the vehicle to hold the door closed; a detent movably mounted on the frame and adapted to hold the latching means against movement in a door opening direction; release means for moving the detent out of holding relationship with the latching means; a locking lever mounted on the frame for movement between a locked position wherein it renders the release means ineffective to move the detent and an unlocked position wherein the release means is effective to move the detent; a manually operable locking device on the door; means including a rod and a motion tranfer bell crank connecting said locking device to said locking lever; means for moving said locking lever from locked to unlocked position in response to closing movement of the door; and inertia means for preventing rebound of said bell crank, rod and locking lever to locked position when the door closes comprising a blocking lever pivotally mounted on the door adjacent said bell crank, spring means yieldably holding said blocking lever out of blocking relationship to said bell crank, and cam means on the bell crank and follower means on the blocking lever for swinging said bell crank against the force of said spring into blocking relation to said bell crank when the bell crank moves from locked to unlocked position.

12. Vehicle door latch and latch control apparatus of the character described, including: a latch frame on the door; latching means movably mounted on the frame including a bolt adapted to engage a keeper on the vehicle to hold the door closed; a detent movably mounted on the frame and adapted to engage the latching means and hold said latching means against movement in a door opening direction; release means including a lever mounted for movement on the frame between coupled and uncoupled relationship with said detent, said lever, when in coupled relation with said detent, being operable to move the detent out of holding engagement with the latching means; a locking lever mounted on the frame for movement between a locked position wherein it uncouples said lever from said detent and an unlocked position wherein it couples said lever to said detent; over-center spring means connected between said locking lever and said frame to yieldably holding said locking lever in either position; a manually operable locking device; means connecting said locking device to said locking lever, said locking lever, manually operable locking device and connecting means having inherent inertia; means for moving said locking lever from locked to unlocked position in response to closing movement of the door; and inertia means separate from the locking parts of the door latch for aiding said inherent inertia and preventing rebound of said locking lever to locked position when the door closes.

References Cited in the file of this patent

UNITED STATES PATENTS

| | | |
|---|---|---|
| 656,232 | Westinghouse | Aug. 21, 1900 |
| 1,819,665 | Wiltse | Aug. 18, 1931 |
| 2,796,149 | Wallin | June 18, 1957 |
| 2,796,276 | Leslie | June 18, 1957 |

UNITED STATES PATENT OFFICE
CERTIFICATION OF CORRECTION

Patent No. 2,960,362 November 15, 1960

Louis P. Garvey

It is hereby certified that error appears in the above numbered patent requiring correction and that the said Letters Patent should read as corrected below.

Column 8, line 9, after "means" insert -- against --.

Signed and sealed this 25th day of July 1961.

(SEAL)
Attest:

ERNEST W. SWIDER
Attesting Officer

DAVID L. LADD
Commissioner of Patents